United States Patent
Sakiyama et al.

(10) Patent No.: US 6,531,856 B2
(45) Date of Patent: Mar. 11, 2003

(54) POWER SOURCE SYSTEM FOR REDUCING POWER CONSUMPTION IN AN INTERMITTENT MODE OF OPERATION

(75) Inventors: Shiro Sakiyama, Osaka (JP); Jun Kajiwara, Kyoto (JP); Masayoshi Kinoshita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/920,670

(22) Filed: Aug. 3, 2001

(65) Prior Publication Data

US 2002/0030474 A1 Mar. 14, 2002

(30) Foreign Application Priority Data

Aug. 4, 2000 (JP) ........................................ 2000-237019

(51) Int. Cl.[7] ................................................. G05F 1/40
(52) U.S. Cl. ...................................................... 323/288
(58) Field of Search ................................ 323/282, 283, 323/288, 351

(56) References Cited

U.S. PATENT DOCUMENTS 5,457,421 A * 10/1995 Tanabe ........................ 327/530
6,150,800 A * 11/2000 Kinoshita .................... 323/280

FOREIGN PATENT DOCUMENTS

JP 2000-037036 7/1998

* cited by examiner

Primary Examiner—Adolf Deneke Berhane
(74) Attorney, Agent, or Firm—McDermott, Will & Emery

(57) ABSTRACT

During an intermittent operation mode, a switch is normally opened and a capacitor with a large capacitance is isolated from a circuit. Under this condition, a power source voltage is intermittently supplied to a driven device. Since a charge/discharge current of the capacitor during the intermittent operation mode is limited to the charge/discharge current of the capacitor with a small capacitance, the power consumption can be lowered. In addition, since no switch exists in the current path from a power source voltage conversion circuit to the driven device, there is no drop, due to a switch, in the voltage supplied from the power source voltage conversion circuit to the driven device. On the other hand, during a continuous operation mode in which power source voltage is continuously provided to the driven device, the switch is normally closed and a capacitor with a large capacitance is connected to the power source system. Then the noise level in the supplied power is lowered.

23 Claims, 10 Drawing Sheets

FIG. 1
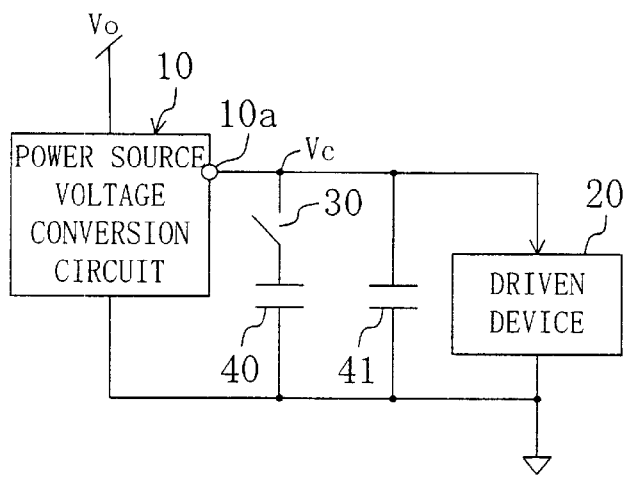
FIG. 2
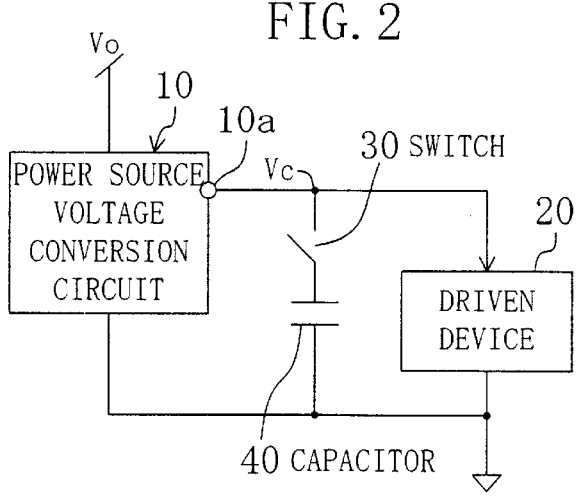
FIG. 3
|  | CONTINUOUS OPERATION MODE | INTERMITTENT OPERATION MODE | |
| --- | --- | --- | --- |
|  |  | DURING OPERATION PERIOD | DURING NON-OPERATION PERIOD |
| SWITCH 30 | ON | OFF | OFF |
| POWER SOURCE VOLTAGE CONVERSION CIRCUIT 10 | ON | ON | OFF |

POWER SOURCE SYSTEM FOR REDUCING POWER CONSUMPTION IN AN INTERMITTENT MODE OF OPERATION

BACKGROUND OF THE INVENTION

This invention relates to a power source system of which the power consumption is reduced by management of the power using an intermittent operation mode.

In recent years the threshold voltage of CMOS transistors has become gradually lower as the demand for higher processing speeds increases. However, lowering a threshold voltage leads to an increase in leak current in transistors during non-operation periods of the semiconductor integrated circuit.

Conventional mobile devices (particularly cellphones and the like) adopt an approach called an intermittent operation mode for extending the possible standby duration time. An intermittent operation mode is a part of the power management technology for lowering power consumption, namely an operation mode for switching between operation and nonoperation states during a short time.

For example, a cellphone intermittently receives signals at intervals of 200–800 ms. Typically, a power source voltage and a clock signal are provided for the components that address the specific tasks during signal reception, while the provision of clock signal is halted during the non-operation period.

As the leak current increases in the transistors, however, a problem arises in that the amount of stationary current cannot be small enough to be neglected or power saving cannot be attained only by stopping the supply of clock signal.

Therefore, as shown in FIG. 16, an approach has been proposed in which power is saved during the non-operation period by turning off the power supply to LSI and thereby reducing the stationary leak current.

Referring now to FIG. 16, a power source voltage conversion circuit is denoted by 10 which is capable of turning ON/OFF the output, a capacitor is denoted by 40 and a semiconductor integrated circuit (LSI) is denoted by 20. During the operation period, the power source voltage conversion circuit 10 is turned on and voltage is supplied to the LSI 20, while during the non-operation period the power source voltage conversion circuit 10 is turned off and the voltage supply to the LSI 20 is stopped. As a result, electric power can be saved since the stationary current running even during the nonoperation period of the LSI 20 can be cut.

FIG. 17 shows the waveform of an output voltage Vc supplied from the power source voltage conversion circuit 10. FIG. 17 shows an example of an operation during an intermittent operation mode. During the operation, the output voltage of the power source voltage conversion circuit 10 is driven to the operation voltage (Vc(on)) of the LSI, while during the non-operation mode the output of the power source voltage conversion circuit 10 is cut. As a result, during the non-operation period, the voltage Vc(on) gradually decreases to a ground voltage level as the stationary leak current runs in the LSI 20. However, this prior art method has the following problems.

In general, the LSI has a capacitor 40 that is referred to as a bypass capacitor. This is inserted to reduce the high frequency impedance of the power source and should have a relatively large capacitance (several $\mu$F) depending on the consumption current and the noise level of the LSI.

In the structure shown in FIG. 16, all the energy stored in the capacitor 40 is consumed by the stationary leak current during the transition from the operation period to the non-operation period. Therefore, the capacitor 40 must be recharged when the circuit state changes from non-operation to operation. The average consumption current for this recharge is given by equation (1):

$$Ic1 = CVc(on)/T,\qquad \text{Equation (1)}$$

where Ic1 is an average consumption current in the capacitor 40, C is a capacitance of the capacitor 40, vc(on) is an output voltage when the power source voltage conversion circuit 10 is ON, and T is an intermittent interval during an intermittent operation mode. If the output of the power source voltage conversion circuit 10 is turned off, the stationary leak current in the LSI 20 can be cut. However, if the intermittent interval T is short and the capacitance c of the capacitor 40 is large, the power consumption becomes large in the capacitor 40.

A solution to this problem is disclosed in Japanese Patent Laid-Open Publication No. 2000-37036A. Referring now to FIG. 18, the invention disclosed is briefly explained. In FIG. 18, reference numeral 10 denotes a power source voltage conversion circuit capable of turning ON/OFF the output, 40 a capacitor, and 20 a semiconductor integrate circuit (LSI); a diode 50 and a switch 30 are added. The same components in the figures are denoted by the same reference numerals.

During the operation of the intermittent operation mode, the output of the power source voltage conversion circuit 10 is turned on and the switch 30 is also turned on. Then the voltage Vc(on) is supplied to the LSI 20. During the non-operation period, the output of the power source voltage conversion circuit 10 is turned off and the switch 30 is also turned off. As a result, the power supply to the LSI is cut.

In this case the voltage across the terminals of the capacitor 40 is given by equation (2).

$$is\ Vc(\text{off}) = Vdd - 2Vf,\qquad \text{Equation (2)}$$

where Vc(off) is an output voltage Vc during the period the power source voltage conversion circuit 10 is off, Vdd is a power source voltage supplied to the power source voltage conversion circuit 10 and Vf is a forward bias voltage of the diode 50. The voltage Vc(off) is set slightly lower (as much as $\Delta V$) than Vc(on) by controlling the number of steps in the diode 50.

FIG. 19 shows the waveform of the output voltage Vc supplied from the power source voltage conversion circuit 10.

FIG. 19 shows an example of an operation during the intermittent operation mode in the circuit of FIG. 18. During the operation, the output voltage of the power source voltage conversion circuit 10 is driven to the operation voltage (Vc(on)) of the LSI 20, while during the non-operation mode the output of the power source voltage conversion circuit 10 is cut. As a result, during the non-operation period, the voltage Vc gradually decreases to the voltage Vc(off) because of the leak current in the capacitor 40 and switch 30.

In this case, the average consumption current consumed in the capacitor 40 is given by an equation (3):

$$Ic2 = C\Delta Vc/T,\qquad \text{Equation (3)}$$

where Ic2 is an average consumption current in the capacitor 40 in FIG. 18, C is a capacitance of the capacitor 40, and $\Delta$Vc is a difference between Vc(on) and Vc(off).

If the voltage difference $\Delta$Vc is controlled to be almost zero, the charge/discharge current from the capacitor 40 becomes small enough to be neglected.

The power source voltage conversion circuit 10 has the function of turning On/Off (provision/non-provision of) the output voltage Vc; the method for realizing this function is briefly described below. FIG. 20 illustrates a power source voltage step-down conversion circuit, generally called a linear regulator. In the power source voltage conversion circuit 10 of the figure there is an operational amplifier 60, a reference voltage generation circuit 61, an output transistor 62, and switches (control means) 31 and 32.

During the operation of the intermittent operation mode, the operational amplifier 60 controls the gate voltage of the output transistor 62 by feedback so that an output voltage Vref of the reference voltage generation circuit 61 becomes equal to the output voltage Vc of the power source voltage conversion circuit 10.

In this case, the ground node of the operational amplifier 60 is connected to ground by the switch 32 and since the switch 31 is turned off the operational amplifier provides the output voltage Vc normally. During the non-provision period of the output voltage Vc, the switch 32 is turned off and the switch 31 is turned on. Then if the gate voltage of the output transistor 62 is set at the power source voltage Vdd, the output transistor 62 can be completely turned off.

With the provision of switches 31 and 32 the power source voltage conversion circuit 10 has the function of switching On/Off the output voltage Vc.

Although the power source system of the configuration shown in FIG. 18 works well to suppress charge/discharge current of the capacitor 40 during the intermittent operation mode, it still has the following problems.

The first problem is that the voltage Vc(off) varies depending on the power source voltage Vdd, as indicated by the aforementioned equation(2). Therefore, the effect of lowering power consumption provided by the aforementioned configuration is weakened when the above configuration is applied to a system in which the power source voltage Vdd fluctuates significantly.

The second problem is a voltage drop due to the ON-resistance in the switch 30. During the operation of the intermittent operation mode, electric current flows from the output transistor 62 of the power source voltage conversion circuit 10 to the LSI 20 via the switch 30. In this case, the voltage across the LSI 20 drops due to the ON-resistance in the switch 30.

Cellphones and other devices have the intermittent operation mode for a non-speech period and the continuous operation mode for a speech period. In general, the current running in the continuous operation mode is larger than that in the intermittent operation mode.

As a result, because the voltage drop caused by the switch 30 in the continuous operation mode becomes larger than that in the intermittent operation mode in the case of the configuration shown in FIG. 18, it is difficult to ensure the stable operation of the LSI 20.

SUMMARY OF THE INVENTION

The object of the present invention is to limit the charge/discharge current of a capacitor to a minimum during an intermittent operation mode in order to effectively reduce a power consumption and prevent a drop in an input power source voltage supplied to a driven device by isolating a switch from a current path from a power source voltage conversion circuit to a driven LSI.

To achieve the object, a capacitor for a continuous operation mode and another capacitor for an intermittent operation mode are installed in the present invention. Also, the capacitor for the continuous operation mode is cut off from the current path during the intermittent operation mode.

Namely, the power source system according to the present invention has a power source voltage conversion circuit for converting a first voltage into a second voltage, having an output node providing the second voltage and control means for controlling provision and non-provision of the second voltage, and capable of being exchanged by the control means between continuous and intermittent operation modes for continuously and intermittently providing the second voltage respectively. In addition, there is a first capacitor inserted between the output node of the power source voltage conversion circuit and ground, and a driven device powered by the second voltage supplied from the power source voltage conversion circuit. Also, there is a switching means inserted between the output node of the power source voltage conversion circuit and the first capacitor or between the first capacitor and ground.

In the above-mentioned power source system according to this invention, the switching means moves into a connection state during the continuous operation mode in which the driven device is continuously driven by the second voltage supplied from the power source voltage conversion circuit. At the same time the switching means moves into the non-connection state during the intermittent operation mode in which the driven device is intermittently driven by the second voltage supplied from the power source voltage conversion circuit.

Further, the power source system according to the present invention has a second capacitor inserted between the output node of the power source voltage conversion circuit and ground.

Still further, in the above-mentioned power source system according to the invention, the first capacitor has a large capacitance and the second capacitor has a small capacitance.

In addition, the switch is integrated with either the power source voltage conversion circuit the capacitor or the driven device in the above-mentioned power source system according to the present invention.

Then the present invention has the following effects. In a power source system which drives cellphones, for example, the first capacitor of a large capacitance is cut off by opening the switching means during the intermittent operation mode. Under this condition, the second voltage is intermittently supplied from the power source voltage conversion circuit and this converted voltage is supplied to the device to be driven. As a result, when the second voltage is provided, the charge/discharge current of the capacitor is limited to the charge/discharge current of the second capacitor. Then the power consumption is substantially lowered during the intermittent operation mode. Further, the switching means is used for connecting and disconnecting the first capacitor of a large capacitance, and this switching means is cut off from the current path between the power source voltage conversion circuit and the driven device during the intermittent operation mode. Therefore, the ON-resistance of the switch does not cause a drop in the input power source voltage, which is different from the prior case.

Further, during the continuous operation mode the switching means is closed and the first capacitor of a large capacitance is coupled with the power source system. Thus noise is reduced in the power source voltage that is provided to the driven device during the continuous operation mode.

In addition, since the major part of the power source system is integrated, the quantity of components constituting the power source system is reduced, the cost of the power source system is reduced, and the size of the device mounting area becomes smaller.

BRIEF DESCRIPTION OF THE DRAWINGS

FIG. 1 is a block diagram illustrating an example of the configuration of a power source system according to a first embodiment of the invention.

FIG. 2 is a block diagram illustrating another example of the configuration of the power source system according to the first embodiment of the invention.

FIG. 3 is a diagram illustrating the operation of each component in the first embodiment of the invention.

DETAILED DESCRIPTION OF THE INVENTION

Each preferred embodiment of the present invention will be described in detail with reference to the accompanying drawings.

Embodiment 1

Figure 20:
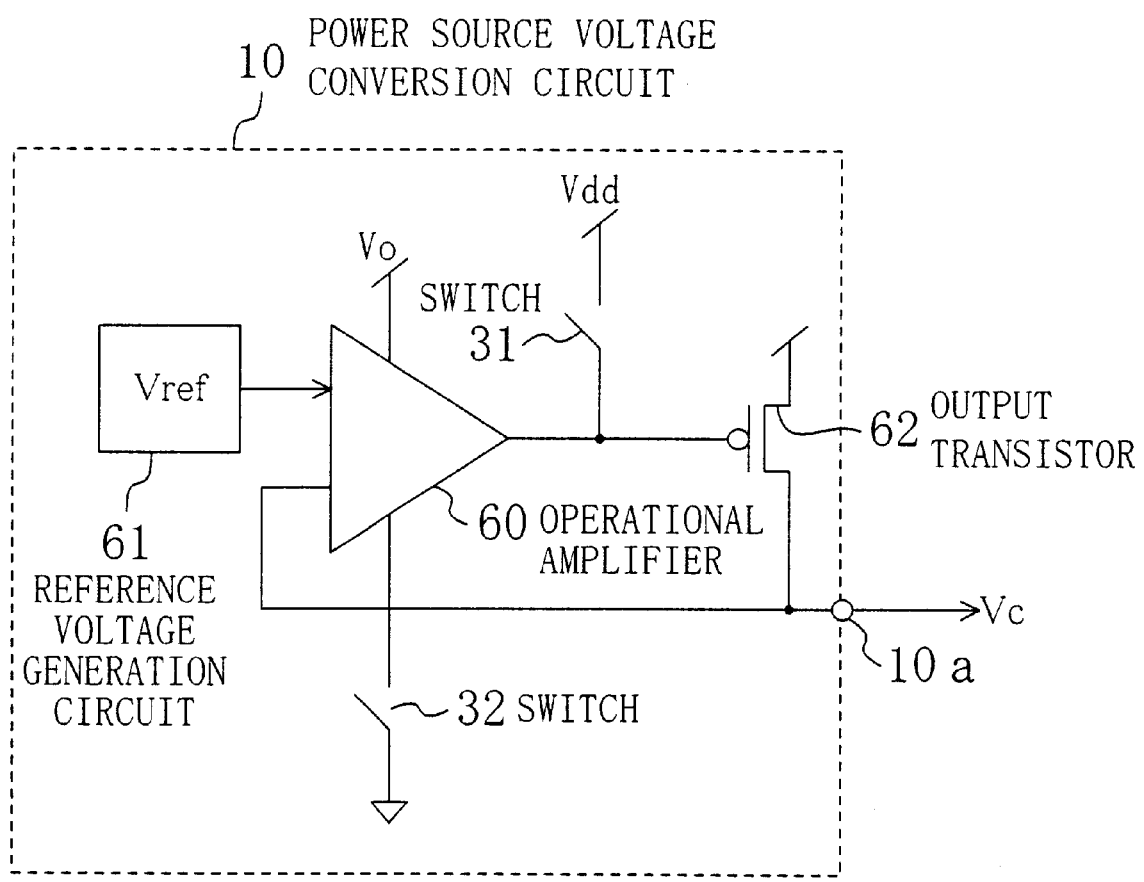
FIG. 20 is a diagram illustrating an example of the configuration of a power source voltage conversion circuit.

FIG. 1 is a block diagram illustrating an example of a configuration of a power source system according to a first embodiment of the invention. In FIG. 1, a power source voltage conversion circuit 10 receives a power source voltage Vo(first voltage). AS shown in FIG. 20, the power source voltage conversion circuit 10 converts the power source voltage Vo(first voltage) to a voltage Vc(second voltage) and has an output node 10a that outputs the converted voltage Vc. The power source voltage conversion circuit 10 switches between a continuous operation mode in which it continuously outputs Vc during the period a switch 32 is connected (closed) and an intermittent operation mode in which it intermittently outputs voltage Vc during the period the switch 32 switches alternatively between a connection state and a non-connection (open) state.

In FIG. 1, a driven device 20, such as a cellphone, a first capacitor 40, and a second capacitor 41 are connected in parallel and receive the voltage Vc from the output node 10a of the power source voltage conversion circuit 10. A switch 30 (switching means) is inserted between the output node 10a of the power source voltage conversion circuit 10 and the first capacitor 40.

FIG. 3 illustrates the ON/OFF states of each component during the continuous and the intermittent operation modes. In this embodiment of the invention, the switch 30 is normally ON (closed) during the continuous operation mode in which the driven device 20 is continuously operated. During the intermittent operation mode in which the driven device 20 is intermittently operated, the switch 30 is normally OFF (closed), and the power source voltage conversion circuit 10 outputs the voltage vc during the operation and stops its voltage provision during the non-operation period.

For example in a cellphone, the continuous operation mode typically corresponds to an operation while speaking, while the intermittent operation mode typically corresponds to an intermittent receiving operation while on standby. Therefore, the current consumed in the driven device 20 is larger in the continuous operation mode than in the intermittent operation mode. In order to stabilize the input power source voltage provided to the driven device 20, a bypass capacitor with a larger capacitance becomes necessary as the consumed current grows.

The capacitance of the first capacitor 40 in FIG. 1 is large enough to stabilize the input power source voltage supplied to the driven device 20 during the continuous operation mode. The capacitance of the second capacitor 41 is small enough to stabilize the input voltage to the driven device 20 during the intermittent operation mode.

In particular, an electrolytic capacitor that has a relatively high capacitance and that shows excellent low-frequency characteristics is recommended as the first capacitor 40, while a small-capacitance ceramic capacitor which has excellent high-frequency characteristics is recommended as the second capacitor 41.

In the power source system according to this embodiment, current is consumed in only the second capacitor 41 with a small-capacitance during the charge/discharge of the capacitor in the intermittent operation mode. As a result, the average current during the charge/discharge of the capacitor can be lowered significantly.

On the other hand, in the continuous operation mode, the switch 30 turns on and then the first capacitor 40 is connected to the output node 10a of the power source voltage conversion circuit 10. Thus the input power source voltage provided to the driven device 20 can be stabilized. In addition, since the switch 30 is isolated from the current path to the driven device 20, there is no drop in the input power source voltage provided to the driven device, which is caused by the ON resistance in the switch as observed in the prior art system.

Figure 4:
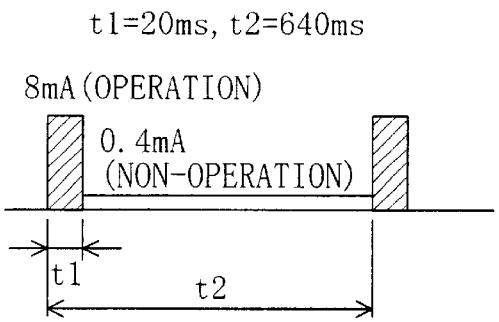
FIG. 4 is a diagram illustrating an example of intermittent intervals in an intermittent operation mode of the power source system according to the first embodiment of the invention.
Figure 5:
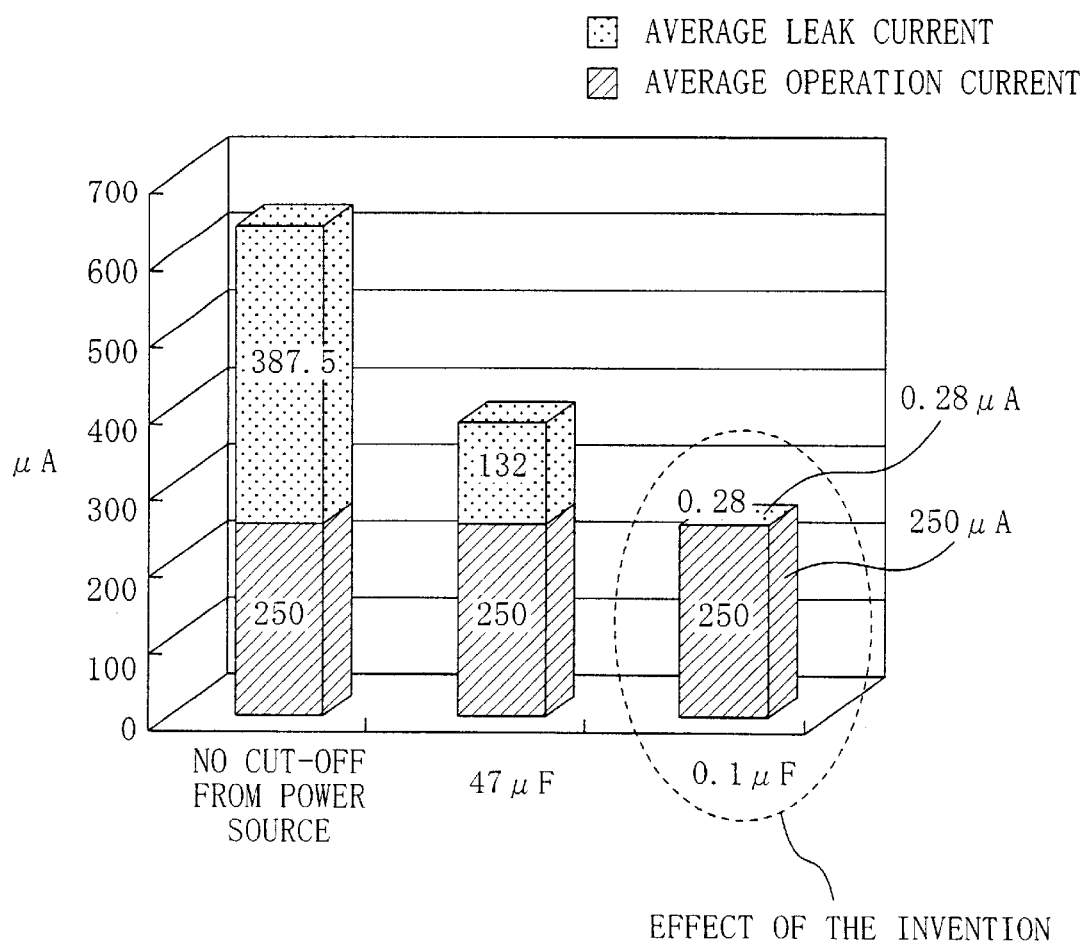
FIG. 5 is a diagram demonstrating the effect of a reduction in current consumption in the power source system according to the first embodiment of the invention.

FIGS. 4 and 5 explain the effect of reducing current consumption during the intermittent operation mode in the power source system according to the present embodiment. Referring now to FIG. 4, an operation time t1 is set at 20 ms and an intermittent interval t2 is assumed to be 640 ms in the intermittent operation mode. Also assumed is that an operation current(current during t1) is 8 mA and a leak current during the non-operation period (stationary leak current of the driven device 20 when the clock is stopped) is 400 $\mu$A. Under the above assumption, if the power source voltage conversion circuit 10 is not set at the intermittent operation mode and the clock signal is stopped, an average leak current of about 387.5 $\mu$A flows during the non-operation period.

Figure 16:
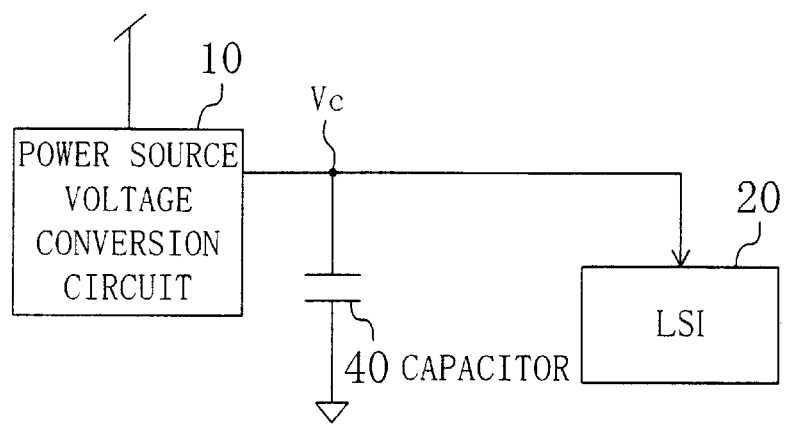
FIG. 16 is a block diagram illustrating an example of the configuration of a prior art power source system.
Figure 17:
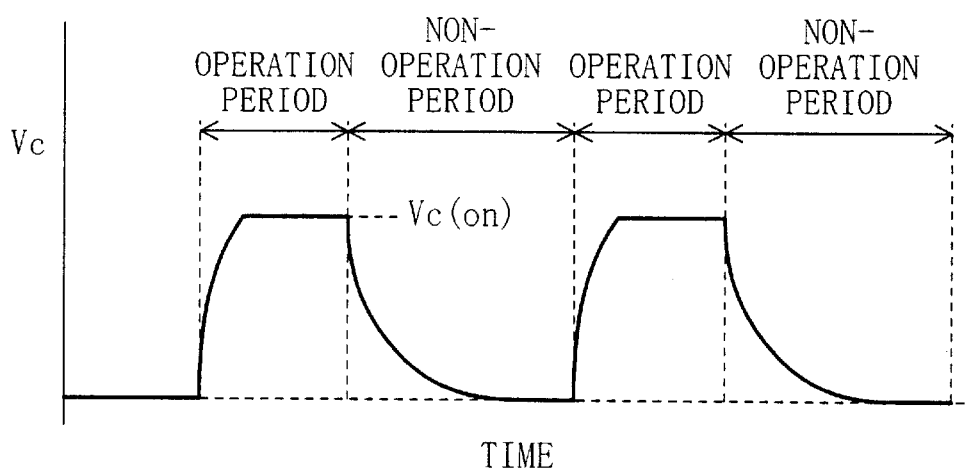
FIG. 17 is a block diagram illustrating the operation of the prior art power source system.
Figure 18:
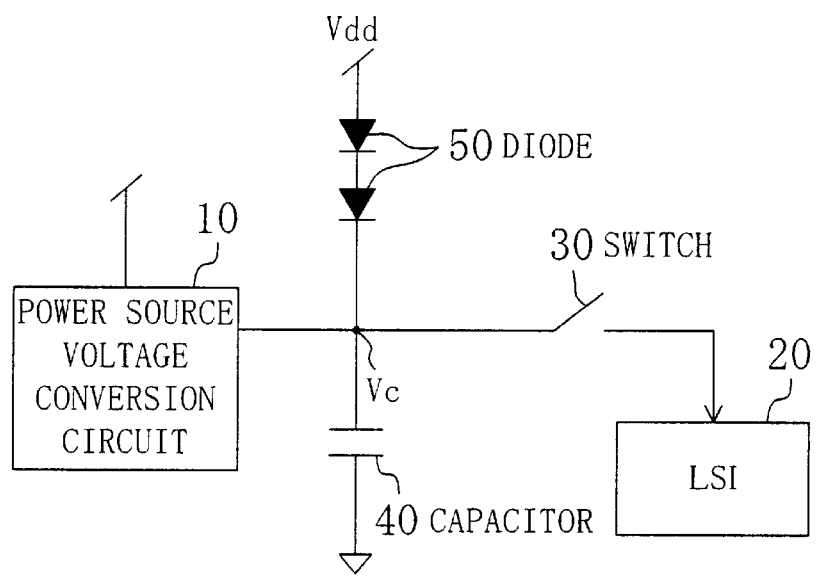
FIG. 18 is a block diagram illustrating another example of the configuration of the prior art power source system.
Figure 19:
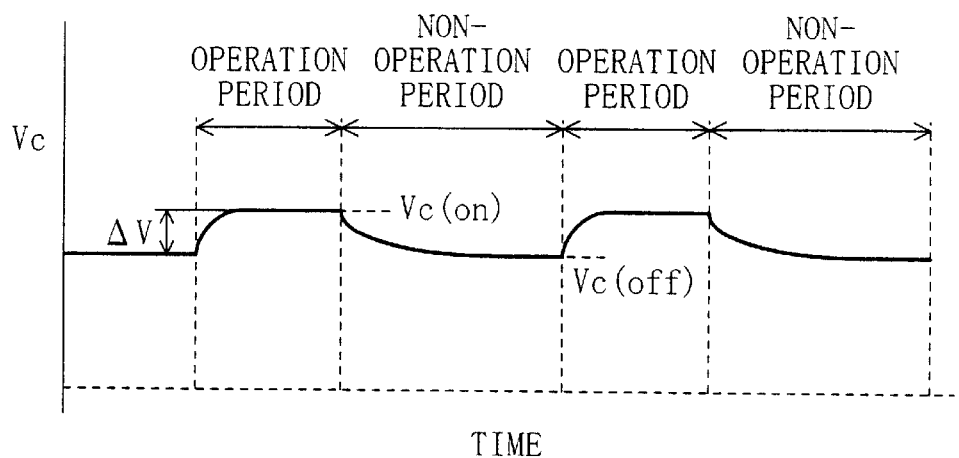
FIG. 19 is a block diagram illustrating the operation of the prior art power source system of the configuration shown in FIG. 18.

In the prior art power source system of FIG. 16, if the capacitance of the capacitor 40 is 47 $\mu$F, the stationary leak current from the LSI 20 is replaced by the charge/discharge current of the capacitor 40 and may be regarded as an average leak current of about 132 $\mu$A.

In the power source system of FIG. 1 according to the present embodiment, if the capacitance of the first electrolytic capacitor 40 is 47 $\mu$F and that of the second ceramic capacitor 41 is 0.1 $\mu$F, the operation is limited to the charge/discharge of the second ceramic capacitor 41 during the intermittent operation mode. Then the equivalent average leak current becomes a mere 0.28 $\mu$A. This is much smaller than the average current(250 $\mu$A) during operation in the intermittent operation mode shown in FIG. 5, small enough to be almost negligible.

If it is possible without an external bypass capacitor to run the driven device 20(for example a cellphone) in the intermittent operation mode (for example during standby), the system may have a configuration in which the second capacitor 41 in FIG. 1 is absent, as shown in FIG. 2. The configuration of FIG. 2 can be applied to a case in which the driven device 20 has a sufficient amount of capacitance compared to the power source and the current in the driven device 20 is so small during the intermittent operation mode that an external bypass capacitor is unnecessary. The configuration of FIG. 2 can also be applied to a case in which the output impedance of the power source voltage conversion circuit 10 is very small.

Embodiment 2

Figure 6:
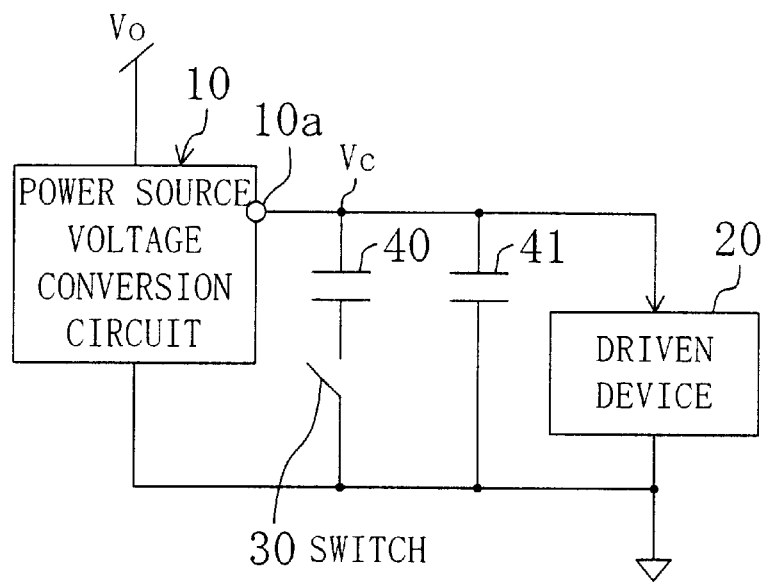
FIG. 6 is a block diagram illustrating the configuration of the power, source system according to a second embodiment of the invention.

FIG. 6 shows the power source system according to a second embodiment of the present invention. The components shown in FIG. 6 are the same as those in FIG. 1 and are denoted by the same reference numerals. The difference between the present embodiment and the first embodiment shown in FIG. 1 is as follows. In the first embodiment of FIG. 1, the switch 30 controls the connection between the output node 10a of the power source voltage conversion circuit 10 and the first capacitor 40, while in the present embodiment the switch 30 in FIG. 6 controls the connection between the first capacitor 40 and ground.

The ON/OFF control of each component during the continuous and the intermittent operation modes of the power source system according to the present embodiment is the same as that shown in the first embodiment of FIG. 3.

Therefore, the same effect of reducing current consumption can be expected.

Figure 7:
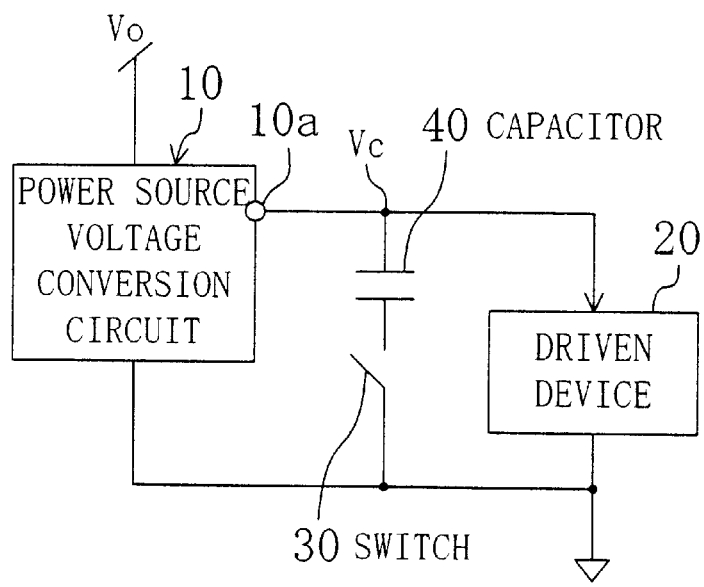
FIG. 7 is another configuration of the power source system of the second embodiment of the invention.

If the operation of the intermittent operation mode is possible without the external bypass capacitor, the system may have a configuration like that in FIG. 2 in which the second capacitor 41 is absent as shown in FIG. 7. The configuration of FIG. 7 can be applied to a case in which the driven device 20 has a sufficient amount of capacitance compared to the power source and the current in the driven device 20 is so small during the operation of the intermittent operation mode that an external bypass capacitor is unnecessary. The configuration of FIG. 7 can be applied to a case in which the output impedance of the power source voltage conversion circuit 10 is very small.

Embodiment 3

Figure 8:
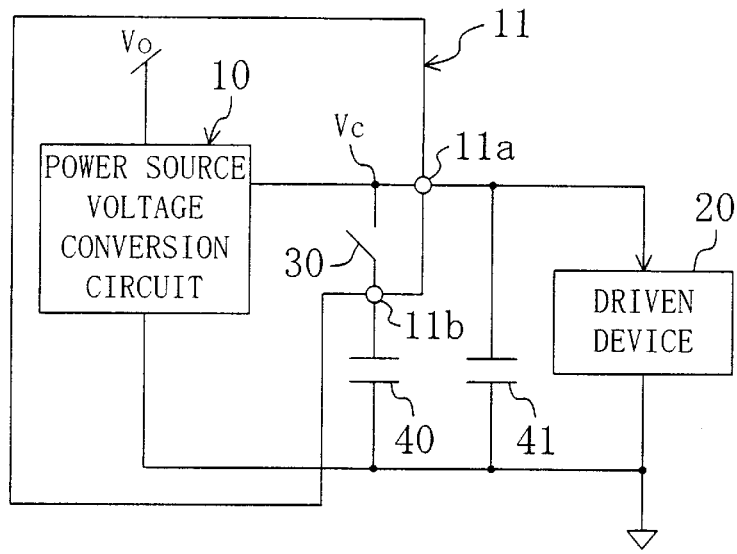
FIG. 8 is a block diagram illustrating an example of a configuration of a power source voltage conversion circuit and a power source system according to a third embodiment of the invention.

FIG. 8 shows the power source system according to a third embodiment of the present invention. The components in the configuration of FIG. 8 are all the same as those in the configuration of FIG. 1 and are denoted by the same reference numerals. However, the power source voltage conversion circuit 11 of FIG. 8 has a configuration in which the components constituting the power source voltage conversion circuit 10 is composed and the switch 30 shown in FIG. 1 have been integrated. Because the system is integrated the power source voltage conversion circuit 11 has a first output node 11a that directly provides the second voltage Vc. The power source voltage conversion circuit 11 also has a second output node 11b that provides the second voltage Vc via the integrated switch 30. The driven device 20 and the second capacitor 41 are connected to the first output node 11a in parallel, while the first capacitor 40 is connected to the second output node 11b. As a result of the integration of the power source voltage conversion circuit 10 and the switch 30, it is possible to reduce the number of the components used in the power source system.

Figure 9:
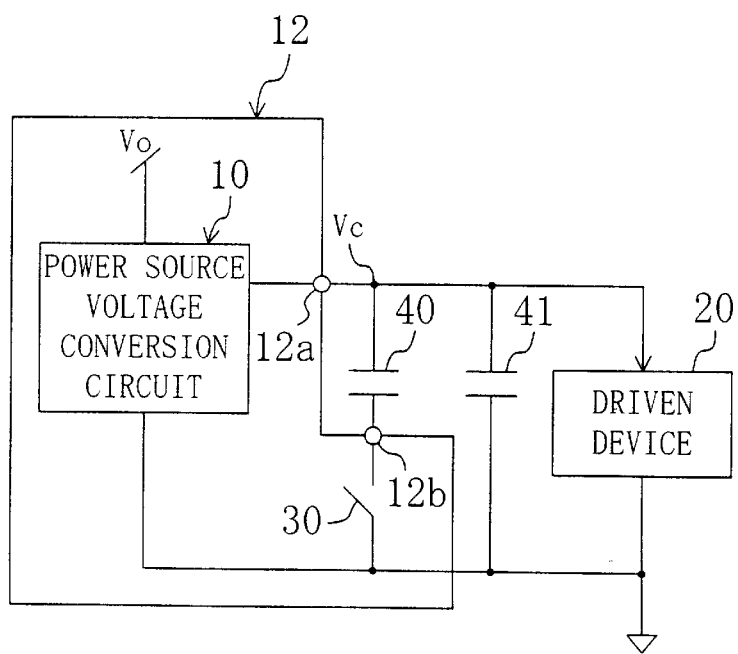
FIG. 9 is a block diagram illustrating another example of the configuration of the power source voltage conversion circuit and the power source system according to the third embodiment of the invention.

All the components in the configuration of FIG. 9 are the same as those in the configuration of FIG. 6 and are denoted by the same reference numerals. However, the power source voltage conversion circuit 12 of FIG. 9 has a configuration in which the power source voltage conversion circuit 10 and the switch 30 in FIG. 6 have been integrated. Because the system is integrated the power source voltage conversion circuit 12 has a first output node 12a that directly provides the second voltage Vc. The power source voltage conversion circuit 12 also has a second output node 12b that is connected to ground via the integrated switch 30. The driven device 20, an electrode of the first capacitor 40, and an electrode of the second capacitor 41 are connected to the output node 12a in parallel. The other electrode of the first capacitor 40 is connected to the input node 12b. As a result of the integration of the power source voltage conversion circuit 10 and the switch 30, it is possible to reduce the number of the components used in the power source system.

Embodiment 4

Figure 10:
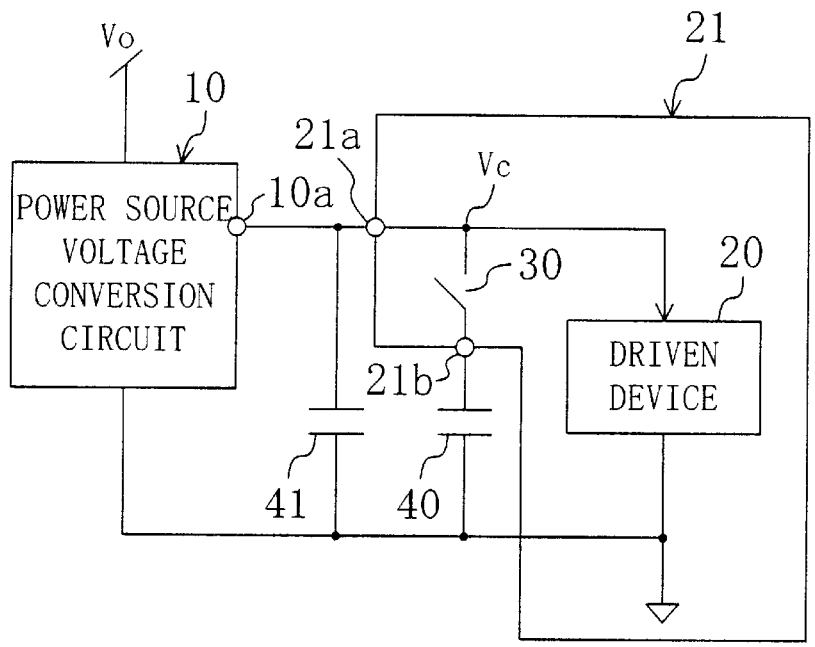
FIG. 10 is a block diagram illustrating an example of a configuration of a driven device and a power source system according to a fourth embodiment of the invention.

FIG. 10 shows the power source system according to a fourth embodiment of the present invention. The components in the configuration of FIG. 10 are all the same as those in the configuration of FIG. 1 and are denoted by the same reference numerals. However, the driven device 21 of FIG. 10 has a configuration in which the driven device 20 and the switch 30 shown in FIG. 1 have been integrated. With this integrated system the driven device 21 has an input node 21a to which the second voltage Vc is supplied from the power source voltage conversion circuit 10, and an output node 21b that provides the second voltage Vc via the integrated switch 30. The output node 10a of the power source voltage conversion circuit 10 and an electrode of the first capacitor 40 are connected to the input node 21a. The electrode of the second capacitor 41 is connected to the output node 21b. As a result of the integration of the driven device 20 and the switch 30, it is possible to reduce the number of the components used in the power source system.

Figure 11:
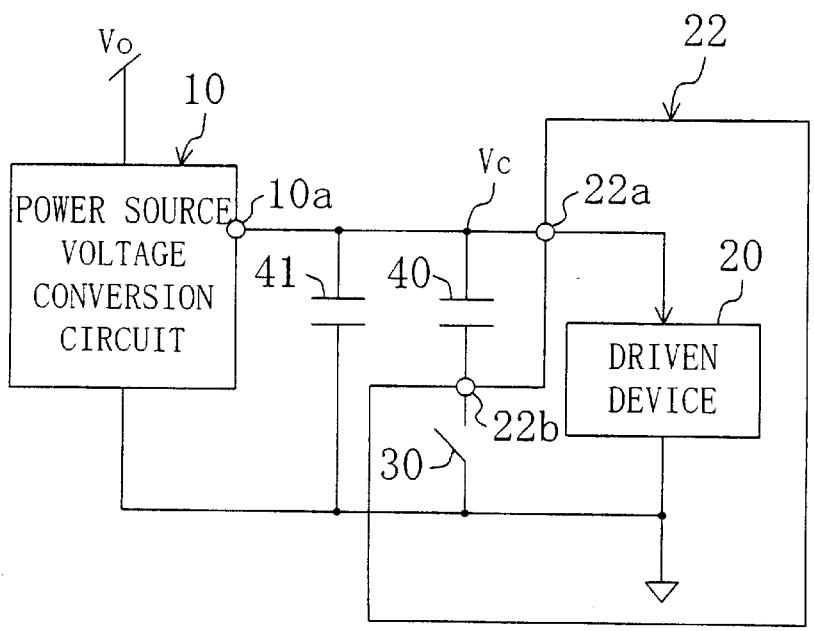
FIG. 11 is a block diagram illustrating another example of the configuration of the driven device and the power source system according to the fourth embodiment of the invention.

All the components in the configuration of FIG. 11 are the same as those in the configuration of FIG. 6 and are denoted by the same reference numerals. However, the driven device 22 of FIG. 11 has a configuration in which the driven device 20 and the switch 30 in FIG. 6 have been integrated. With this integrated system, the driven device 22 has an input node 22a to which the second voltage Vc is supplied from the power source voltage conversion circuit 10, and an output node 22b that is connected to ground via the integrated switch 30. The output node 10a of the power source voltage conversion circuit 10, an electrode of the first capacitor 40, and an electrode of the second capacitor 41 are connected to the input node 21a in parallel. The other electrode of the second capacitor 41 is connected to the input node 22b. As a result of the integration of the driven device 20 and the switch 30, it is possible to reduce the number of the components used in the power source system.

Embodiment 5

Figure 12:
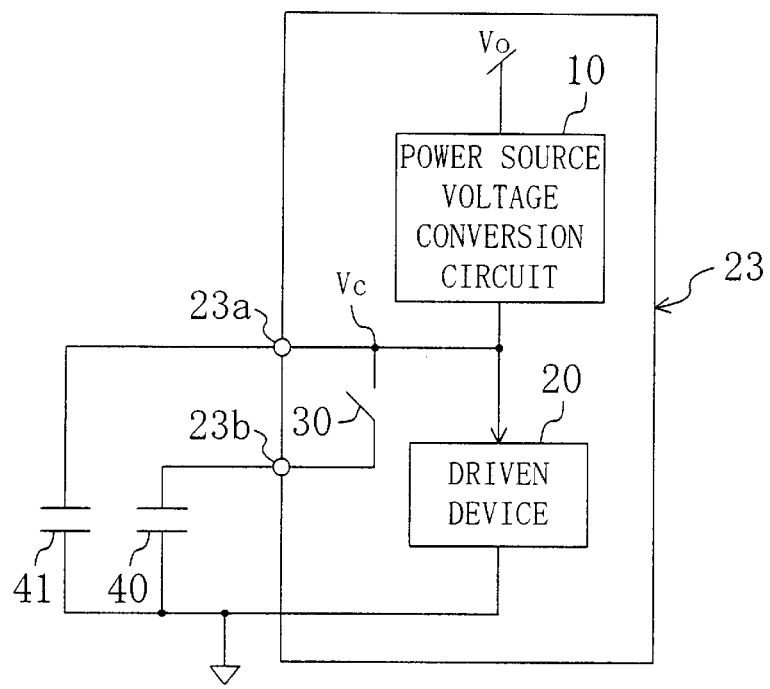
FIG. 12 is a block diagram illustrating an example of a configuration of a semiconductor integrated circuit and a power source system according to a fifth embodiment of the invention.

FIG. 12 shows the power source system according to a fifth embodiment of the present invention. The components in the configuration of FIG. 12 are all the same as those in the configuration of FIG. 1 and are denoted by the same reference numerals. However, the semiconductor integrated circuit 23 (hereafter, LSI) of FIG. 12 has a configuration in which the power source voltage conversion circuit 10, the driven device 20 and the switch 30 shown in FIG. 1 have been integrated. The LSI 23 has a first output node 23a that outputs the second voltage Vc supplied from the power source voltage conversion circuit 10, and a second output node 23b that outputs the second voltage Vc via the integrated switch 30. An electrode of the first capacitor 40 is connected to the first output node 23a, while an electrode of the second capacitor 41 is connected to the second output node 23b. As a result of the integration of the power source voltage conversion circuit 10, the driven device 20 and the switch 30, it is possible to reduce the number of the components used in the power source system.

Figure 13:
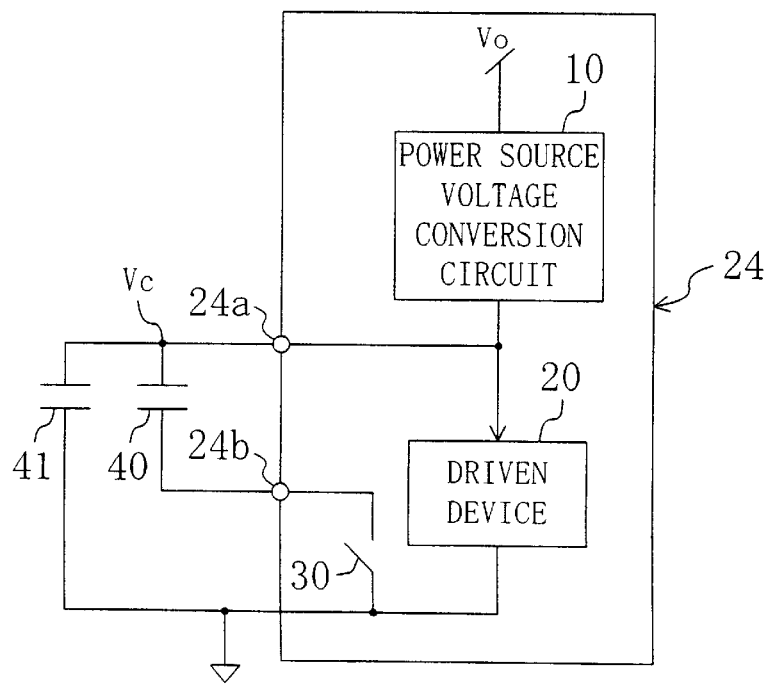
FIG. 13 is a block diagram illustrating another example of the configuration of the semiconductor integrated circuit and the power source system according to the fifth embodiment of the invention.

All the components in the configuration of FIG. 13 are the same as those in the configuration of FIG. 6 and are denoted by the same reference numerals. However, the LSI 24 of FIG. 13 has a configuration in which the power source voltage conversion circuit 10, the driven device 20 and the switch 30 in FIG. 6 have been integrated. This LSI 24 has an output node 24a that outputs the second voltage Vc supplied from the power source voltage conversion circuit 10, and an input node 24b that is connected to ground via the integrated switch 30. An electrode of the first capacitor 40 and an electrode of the second capacitor 41 are connected to the output node 24a. The other electrode of the second capacitor 41 is connected to the input node 24b. As a result of the integration of the power source voltage conversion circuit 10, the driven device 20 and the switch 30, it is possible to reduce the number of the components used in the power source system.

Embodiment 6

Figure 14:
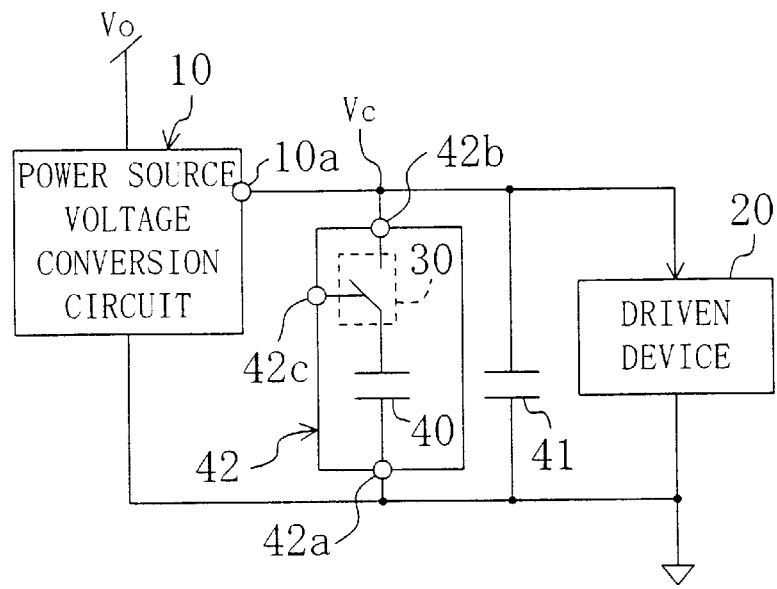
FIG. 14 is a block diagram illustrating an example of a configuration of a chip capacitor and a power source system according to a sixth embodiment of the invention.

FIG. 14 shows the power source system according to a sixth embodiment of the present invention. The components and connection configuration of FIG. 14 are all the same as those of FIG. 1 and are denoted by the same reference numerals. However, the first capacitor 40 of a large capacitance shown in FIG. 14 is integrated with the switch 30 to form a chip capacitor 42. In this chip capacitor 42, an electrode of the first capacitor 40 is connected to a first connection node 42a, while the other electrode is serially connected to a terminal of the switch 30. The other terminal of the switch 30 is connected to a second connection node 42b. The chip capacitor 42 has a third control node 42c which is the control node that controls the opening/closing of the switch 30. The first connection node 42a of the chip capacitor 42 is connected to ground, while the second connection node 42b is connected to the output node 10a of the power source voltage conversion circuit 10.

As a result of the integration of the switch 30 and the first capacitor 40, it is possible to reduce the number of the components used in the power source system.

Figure 15:
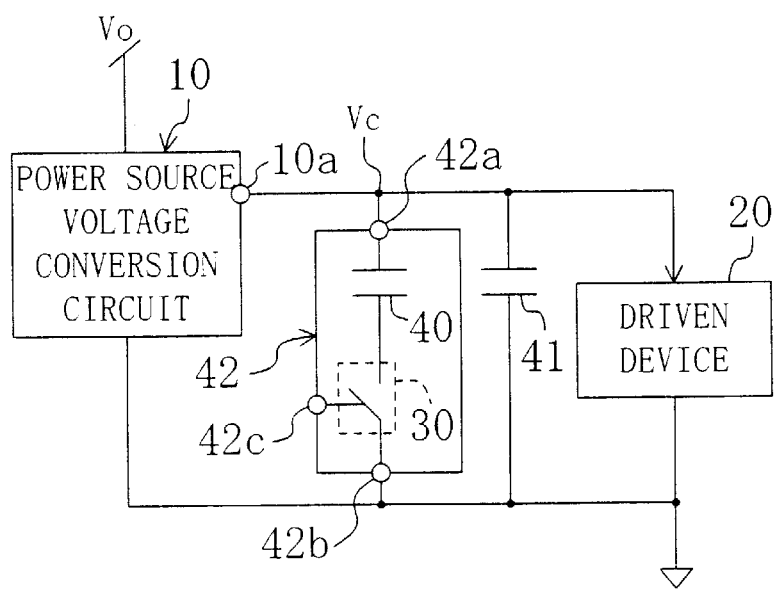
FIG. 15 is a block diagram illustrating another example of a configuration of a chip capacitor and the power source system according to the sixth embodiment of the invention.

All the components in the configuration of FIG. 15 are the same as those in the configuration of FIG. 14 and are denoted by the same reference numerals. The difference is that the first connection node 42a of the chip capacitor 42 is connected to the output node 10a of the power source voltage conversion circuit 10, and the second connection node 42b is connected to ground. As a result, it is possible to reduce the number of the components used in the power source system, as the case of the configuration in FIG. 14.

As mentioned above, when the voltage is supplied to operate a driven device such as a cellphone, a capacitor with a large capacitance and another capacitor with a small capacitance are used, to which a voltage is supplied as well as to the driven device. According to the voltage control method the switch connected to the large capacitance capacitor is normally OFF during the intermittent operation mode and a voltage is supplied to the small capacitance capacitor and the driven device. Because of this current consumption can be effectively reduced during the intermittent operation mode.

In addition, during the continuous operation mode, the switch connected to the large capacitance capacitor is normally ON and then the driven device is powered, the noise level in the input power source voltage supplied from the power source to the driven device can be lowered.

In the embodiments described so far, the cellphone has been used as an example. However, the application range of this invention is not limited to cellphones. If a power source system has any driven device and this driven device has continuous and intermittent operation modes, the present invention can be applied to such a power source system. In this case, if two capacitors are employed for the continuous operation mode and the intermittent operation mode respectively, the capacitance of the capacitor for the intermittent operation mode may be larger than that of the capacitor for the continuous operation mode.

What is claimed is:

1. A power source system comprising:
a power source voltage conversion circuit for converting a first voltage into a second voltage, having an output node providing the second voltage and control means for controlling provision and non-provision of the second voltage, and capable of being exchanged by the control means between continuous and intermittent operation modes for continuously and intermittently providing the second voltage, respectively;
a first capacitor inserted between the output node of said power source voltage conversion circuit and ground;

a driven device powered by the second voltage supplied from said power source voltage conversion circuit; and switching means inserted between the output node of said power source voltage conversion circuit and the first capacitor, or between the first capacitor and ground.

2. The power source system according to claim 1, wherein said switching means moves into a connection state during the continuous operation mode in which said driven device is continuously driven by the second voltage supplied from said power source voltage conversion circuit; and said switching means moves into a non-connection state during the intermittent operation mode in which said driven device is intermittently driven by the second voltage supplied from said power source voltage conversion circuit.

3. The power source system according to claim 1 or 2, further comprising a second capacitor inserted between the output node of said power source voltage conversion circuit and ground.

4. The power source system according to claim 3, wherein said first capacitor has a large capacitance and said second capacitor has a small capacitance.

5. A power source voltage conversion circuit for converting a first voltage into a second voltage, having control means for controlling provision and non-provision of the second voltage, and capable of being exchanged by the control means between continuous and intermittent operation modes for continuously and intermittently providing the second voltage respectively, the power source voltage conversion circuit including:

switching means integrated with components constituting said power source voltage conversion circuit;

an output node directly providing said second voltage bypassing said switching means; and a second output node providing said second voltage via said switching means.

6. A power source voltage conversion circuit for converting a first voltage into a second voltage, having control means for controlling provision and non-provision of the second voltage, and capable of being exchanged by the control means between continuous and intermittent operation modes for continuously and intermittently providing the second voltage respectively, the power source voltage conversion circuit including:

switching means integrated with components constituting said power source voltage conversion circuit;

an output node directly providing said second voltage bypassing said switching means; and an input node connected to ground via said switching means.

7. The power source voltage conversion circuit according to claim 5 or 6, wherein said switching means goes into the connection state when said power source voltage conversion circuit operates in the continuous operation mode, and moves into the non-connection state in the intermittent operation mode.

8. A power source system comprising:

the power source voltage conversion circuit according to claim 5;

a capacitor inserted between the second output node of said power source voltage conversion circuit and ground; and a driven device powered by the second voltage supplied from the first output node of said power source voltage conversion circuit.

9. A power source system comprising:

the power source voltage conversion circuit according to claim 6;

a capacitor inserted between said output node and said input node; and a driven device powered by the second voltage supplied from the output node of said power source voltage conversion circuit.

10. A driven device powered by a voltage supplied from an external source having:

switching means integrated with components constituting said driven device, and an output node for outputting said supplied voltage via said switching means, said switching means coupled to said driven device such that said switching means does not cause a reduction in the level of the voltage supplied to said driven device when said switching means is in a closed state.

11. A driven device powered by a voltage supplied from an external source having:

switching means integrated with components constituting said driven device, and an input node connected to ground via said switching means, said switching means coupled to said driven device such that said switching means does not cause a reduction in the level of the voltage supplied to said driven device when said switching means is in a closed state.

12. The driven device according to claim 10 or 11, wherein:

said driven device is driven by a continuous operation mode, where an external source continuously provides a voltage, and an intermittent operation mode, where the external source intermittently provides the voltage; and said switching means moves into a connection state during the continuous operation mode of said driven device and moves into a non-connection state during the intermittent operation mode of said driven device.

13. A power source system having:

a power source voltage conversion circuit for converting a first voltage into a second voltage, having control means for controlling provision and non-provision of the second voltage, and capable of being exchanged by the control means between continuous and intermittent operation modes for continuously and intermittently providing the second voltage respectively;

the driven device according to claim 10; and a capacitor inserted between the output node of said driven device and ground.

14. A power source system comprising:

a power source voltage conversion circuit for converting a first voltage into a second voltage, having an output node providing the second voltage and control means for controlling provision and non-provision of the second voltage, and capable of being exchanged by the control means between continuous and intermittent operation modes for continuously and intermittently providing the second voltage respectively;

the driven device according to claim 11 powered by the second voltage supplied from the output node of said power source voltage conversion circuit; and a capacitor inserted between the output node of said power source voltage conversion circuit and the input node of said driven device.

15. A semiconductor integrated circuit comprising:

a power source voltage conversion circuit for converting a first voltage into a second voltage, having control means for controlling provision and non-provision of the second voltage, and capable of being exchanged by the control means between continuous and intermittent operation modes for continuously and intermittently providing the second voltage respectively;

a driven device powered by the second voltage supplied from said power source voltage conversion circuit;

switching means integrated with components constituting said power source voltage conversion circuit and said driven device;

a first output node for directly outputting the second voltage converted by said power source voltage conversion circuit; and a second output node for outputting the second voltage converted in said power source voltage conversion circuit via said switching means;

said switching means coupled to said driven device such that said switching means does not cause a reduction in the level of the voltage supplied to said driven device when said switching means is in a closed state.

16. A semiconductor integrated circuit comprising:

a power source voltage conversion circuit for converting a first voltage into a second voltage, having control means for controlling provision and non-provision of the second voltage, and capable of being exchanged by the control means between continuous and intermittent operation modes for continuously and intermittently providing the second voltage respectively;

a driven device powered by the second voltage supplied from said power source voltage conversion circuit;

switching means integrated with components constituting said power source voltage conversion circuit and said driven device;

an output node for directly outputting the second voltage converted by said power source voltage conversion circuit; and an input node connected to ground via said switching means;

said switching means coupled to said driven device such that said switching means does not cause a reduction in the level of the voltage supplied to said driven device when said switching means is in a closed state.

17. The semiconductor integrated circuit according to claim 15 or 16, wherein said switching means moves into a connection state during the continuous operation mode of said power source voltage conversion circuit, and moves into a non-connection state during the intermittent operation mode of said driven device.

18. A power source system having the semiconductor integrated circuit according to claim 15 and a capacitor inserted between the second output node of said power source voltage conversion circuit and ground.

19. A power source system having the semiconductor integrated circuit according to claim 16 and a capacitor inserted between the output node and the input node of said power source voltage conversion circuit.

20. A chip capacitor having first, second and third connection nodes, the chip capacitor having:

a capacitor having electrodes one of which is connected to the first connection node;

switching means integrated with said capacitor having one terminal serially connected to the other electrode of said capacitor, and the other terminal connected to the second connection node; and a control node serving as said third connection node for controlling the opening/closing of said switching means.

21. A power source system comprising:

a power source voltage conversion circuit for converting a first voltage into a second voltage, having an output node providing the second voltage and control means for controlling provision and non-provision of the second voltage, and capable of being exchanged by the control means between continuous and intermittent operation modes for continuously and intermittently providing the second voltage respectively;

a driven device powered by the second voltage supplied from said power source voltage conversion circuit; and the chip capacitor according to claim 20, wherein one of said first and second connection node is connected to the output node of said power source voltage conversion circuit and the other of said first and second connection node is connected to ground.

22. The power source system, driven device or semiconductor integrated circuit according to claim 1, 8, 9, 10, 11, 13, 14, 15, 16, 18, 19 or 21, wherein said driven device is a cellphone having a speech mode driven by the continuous operation mode of said power source voltage conversion circuit, and a standby mode driven by the intermittent operation mode of said power source voltage conversion circuit.

23. A voltage control method for supplying a voltage to drive a driven device, comprising the steps of:

using first and second capacitors connected to said driven device in parallel;

providing a voltage to said driven device by providing a voltage to both first and second capacitors during a continuous operation mode in which the voltage is continuously provided to said driven device; and interrupting the voltage supplied to the first capacitor and providing the voltage only to the second capacitor when providing the voltage to said driven device during an intermittent operation mode in which the voltage is intermittently provided to said driven device.

* * * * *